United States Patent
Fokos

(10) Patent No.: US 7,918,443 B2
(45) Date of Patent: Apr. 5, 2011

(54) UNDER-SHINGLED ARTICLE HANDLING AND STACKING SYSTEM AND METHOD

(75) Inventor: Robert Fokos, Chilmark, MA (US)

(73) Assignee: Robert Fokos, Chilmark, MA (US)

( * ) Notice: Subject to any disclaimer, the term of this patent is extended or adjusted under 35 U.S.C. 154(b) by 152 days.

(21) Appl. No.: 12/330,417

(22) Filed: Dec. 8, 2008

(65) Prior Publication Data

US 2009/0146360 A1 Jun. 11, 2009

Related U.S. Application Data

(60) Provisional application No. 61/012,415, filed on Dec. 7, 2007.

(51) Int. Cl.
*B65H 5/00* (2006.01)

(52) U.S. Cl. .................. 270/52.19; 270/52.09; 271/183; 271/270; 271/202

(58) Field of Classification Search ............... 270/52.19, 270/52.09; 271/183, 270, 202
See application file for complete search history.

(56) References Cited

U.S. PATENT DOCUMENTS

| | | | |
|---|---|---|---|
| 3,198,046 A * | 8/1965 | De Angelo | 83/24 |
| 4,161,092 A | 7/1979 | Buday et al. | |
| 4,867,435 A | 9/1989 | Cogswell | |
| 4,950,510 A | 8/1990 | Massouda | |
| 5,275,394 A * | 1/1994 | Mank et al. | 271/183 |
| 5,704,604 A * | 1/1998 | Koelle et al. | 270/52.09 |
| 6,016,747 A * | 1/2000 | Beduhn et al. | 101/177 |
| 6,969,059 B2 * | 11/2005 | Gafner | 271/69 |
| 6,988,726 B2 * | 1/2006 | Speller | 271/256 |
| 7,347,418 B2 * | 3/2008 | Speller | 271/264 |

* cited by examiner

*Primary Examiner* — Patrick Mackey
(74) *Attorney, Agent, or Firm* — Howison & Arnott, L.L.P.

(57) ABSTRACT

A device and process for processing flat articles such as pieces of paper by utilizing a stream of under-shingled flat articles and generating a gap at predetermined intervals. The under-shingling process incorporates an accelerating and decelerating portion wherein each flat article is accelerated and then decelerated while a tail portion of the article is lifted such that the next flat article can slide underneath to establish an under-shingled stream.

9 Claims, 5 Drawing Sheets

STANDARD OVER SHINGLED

FIG. 6 GAP GENERATION IN A STREAM OF UNDER-SHINGLED PIECES

UNDER-SHINGLED ARTICLE HANDLING AND STACKING SYSTEM AND METHOD

CROSS-REFERENCE TO RELATED APPLICATIONS

This application claims benefit of U.S. Provisional Patent Application No. 61/012,415, filed Dec. 7, 2007, entitled "UNDER-SHINGLED ARTICLE HANDLING AND STACKING SYSTEM AND METHOD," which is incorporated herein in its entirety.

TECHNICAL FIELD

The present invention relates to a system and method for under-shingling a flat or folded article in web printing systems, and in particular systems for creating under-shingled streams of flat articles, systems for placing a gap in a continuous stream of under-shingled articles and/or systems for stacking such under-shingled streams of articles into receptacles in a continuous and indexed manner. Embodiments of this invention are related to a system wherein a web of paper is utilized in a high speed printing or product manufacturing system where ink is applied to the web, the web is cut into pieces and the pieces are handled by various processes until they are turned into a stream of finished product.

BACKGROUND

Systems and apparatus that already exist in the industry that are capable of handling flat articles may begin as a single printed web of paper that is cut. Each individual cut piece is handled such that it creates an over-shingled stream of product. Referring to FIG. 1, there is shown a prior art system wherein a web of printed material 10 enters the finishing portion of the paper handling device. The web 10 is moving at a continuous speed. At predetermined times a cutter 12 cuts the web into a product piece 16 having a predetermined size or length. There are various types of cutters in the market place and every manufacturer of such cutters 12 have different ways of cutting pieces from a web. Of course, once a piece is cut, for example, the piece 16 must be handled by the machinery. Generally, the leading edge 13 of a cut piece 16 is grabbed by a gain device 14 which accelerates the cut piece 16 to a speed slightly greater than the speed of the web 10. The acceleration places a spacing 15 or gap between the cut piece and the end 17 of the web 10. The cut piece 16 is then sent in a somewhat free floating fashion into a diverter 18 where the leading edge 13 of the cut piece 16 comes in contact with a conveyor belt that runs slower than the now approaching piece of cut material 16. A diverter 18 (various manufacturers use various designs) diverts the piece of cut product such that the leading edge 13 of the piece 16 overlaps and lays down on the tail end of the previous cut piece. A weak point or disadvantage in this over-shingling system is that the tail 19 of the previous cut piece of material must freefall and flatten itself on the slower moving belt 22 so that the next cut piece 16 will be able to have its leading edge diverted by the diverter 18 and overlap the tail edge 19 of the previous cut piece. The speed that pieces can be cut and over-shingled is limited by the time it takes for a tail of a piece to lie flat so that a next cut piece can have its leading edge overlap the tail end of the previous cut piece. In the end, each piece 22 has a leading edge that overlaps the previously cut piece and a tail end that is underneath the latter cut piece thereby forming a continuous stream of over-shingled pieces 24. FIG. 2 shows a standard stream of over-shingled pieces 24 moving in a single direction on a conveyor 25.

A further disadvantage of over-shingling is if the conveyor or belt 20 is moving too quickly, the leading edge 13 of one or more over-shingled pieces may become lifted and airborne. Thus, there are two factors in over-shingling that limit the speed of the overall movement of a stream of over-shingled pieces. It should be noted that the single stream of over-shingled pieces 24 is moving at a rate on the belt 20 that is slower than the surface speed of the web 10.

It is further understood that it is presently standard in the industry to establish an over-shingled stream of pieces that are created via a web that is cut by a cutter, and then accelerated by a gain device and diverted into an over-shingled stream. Although various techniques can be used to create the over-shingled stream, it is still understood that the overall speed of the product stream is limited by the prior art techniques of over-shingling. In related industries for example, the newspaper industry, the pages of a newspaper may be folded by various techniques but in the end the stream of completed newspapers are formed into a continuous stream of over-shingled pieces prior to being stacked. Again, various techniques and methods are used, but in the industry, the standard is a stream of over-shingled product.

Thus, FIG. 2 may be considered a figure of any printed product 22 that is formed into an over-shingled stream 24 of folded or pieced product. The over-shingled stream is moving as a continuous stream on a conveyor 25.

FIG. 3 depicts an over-shingling device similar to FIG. 1, wherein a web 10 traveling at a first speed is cut at predetermined places by a cutter 12 such that the leading edge of each cut piece 16 is grabbed by a gain device 14 that accelerates the cut piece 16 to a speed that is faster than the surface speed of the web 10. The cut piece 16 is then diverted and sent to a slower moving conveyor 20 wherein the cut piece's leading edge 13 is laid on top of the trailing edge or tail of the relative previously cut piece thereby forming an over-shingled stream of product 24.

Generally in the industry after an over-shingled stream of product 24 has been created, it will move by conveyor systems 26 or by some other means through various processes to a location where it will usually be stacked by a stacking device 28. Stackers, like stacker 28, come in a large variety of shapes, sizes and designs. Regardless of the wide variety of stacker designs, most stackers 28 follow a similar mechanism wherein shingled stream of pieces is turned upside down 30 so that each piece can be slid underneath the previously stacked piece in the stacker. In other words, the stackers 28 generally stack from the bottom of the stack rather than from the top. Stackers 28 may be in the form of vertical or horizontal stackers, but again, tend always tend to turn the over-shingled stream of pieces 24 upside down such that the piece being stacked slides underneath the previously stacked piece. As the pieces are stacked in the stacker 28, each piece 22 that is being stacked is covered by the previous piece and is therefore no longer shingled but instead, formed into a stack. These stacks now can then be removed and bundled by machine or manually. Stackers 28 are sometimes called accumulators which can be in either vertical or horizontal configurations.

It is understood that this prior art technique of creating an over-shingled stream and stacking the over-shingled stream into a vertical or horizontal accumulator works well in the industry, but such systems have drawbacks. One of the drawbacks is related to adjusting the over-shingling device for various lengths or widths of pieces. That is, if a piece 16 is needed to be shorter than a piece that was run in a prior printing run, the adjustments for the over-shingling device can be significant and time consuming in order to get a same or similar piece overlap in the over-shingled stream. The various speeds of the conveyors, wheels and pulleys of each device must be carefully readjusted. The distances between rollers and other mechanical devices must also be adjusted in order to handle different length pieces in different printing runs. Such a drawback can be very costly to the machine owner because the printing press is not running, but instead down and stopped for adjustments and reconfiguration for lengthy periods of time between printing runs. In other words, "make ready time", the amount of time it takes to make a machine ready for a new product run, is quite lengthy in the prior art type of over-shingling machines and systems. Thus, such machines can be very costly during "make ready time" because the cost per hour can be from $600 to thousands of dollars per hour in downtime and profit lost while the printing system is made ready for a run of pieces that are of a different size than a previous run. For example, if a greeting card manufacturer manufactures various size greeting cards on the same web printing press, each time a different size greeting card is created the cutting and shingling section of the machine requires significant adjustments and recalibration so that each cut piece overlaps the previous cut piece in an over-shingled manner by a same amount in the continuous stream of over-shingled pieces. The downtime of a printing production or between printing productions is extremely costly to a printing company, therefore by shortening or eliminating this downtime would be greatly advantageous to a company that prints and creates products from a moving web.

With respect to an over-shingled stream of pieces that are being stacked by a vertical stacker, which is the most used type of accumulator or stacker in the printing industry, there is a limit as to how high a vertical stack can grow before it either falls over or the bottom piece that is being inserted under the stack cannot be inserted into the stack due to the overall weight of the accumulation of pieces above. Therefore, in various situations the faster the printing operation runs and the faster the stream of over-shingled pieces flow, then the frequency that the accumulated stack of pieces needs to be removed increases. Generally, manual labor is used to remove the accumulated stacks from the machine so that the pieces can be placed in a box tied when wrapped or put in the next stage of the packaging process of finished pieces. In some situations, when a line of over-shingled pieces is moving at maximum speed, the amount of labor required at the end of the line to remove accumulated stacks of pieces becomes overwhelming to a manufacturer in terms of the number of people required, the overall cost, and in various situations, the safety of having a large number of people removing accumulated product from a same or similar accumulator location. In fact, in certain circumstances a manufacturer will choose to slow the printing line and manufacturing process down to a slower speed than its maximum in order to accommodate the manual labor obstacles at the end of the accumulator or line. For example, a company may slow the line down so that two people can handle the workload at the accumulator rather than hire an additional third person and run the line at a higher speed. The bottom line, of course, is that it is costly to slow down a printing machine and manufacturing processes for a company. Thus, it would be advantageous to provide a system and method for cutting and producing a continuous flow of pieces that can be accumulated in a manner that is more automated by machinery as well as able to operate at the machine's highest rate of speed for extended periods of time.

Furthermore, in the printing industry, it is fairly well established that companies that make, manufacture and sell web cutters, such as rotary cutters, or devices that create over-shingled streams of pieces are different and unrelated companies from other companies that specialize in the manufacture and sale of accumulators and stackers, whether they be vertical or horizontally stacking. The machinery generally found in between the cutters/over-shingling devices and the accumulator stackers may be various types of conveyors or systems 26 and finishing systems that prepare the pieced material for stacking. It is a rare and unusual situation wherein the same company manufactures both a rotary cutter and over-shingling device as well as an accumulator or stacking device. As such, it has become standard in the industry to use over-shingling as the preferred technique of transporting cut pieces through various processes that exist between a cutter and over-shingling device and the final stacking accumulator device.

What is needed is a new type of system or method of moving cut pieces from a web printing press at high rates of speed through a process and to an accumulator stacker that allows for the machinery to operate at or near its maximum manufacturing rates. Furthermore, it would be additionally useful if such machinery would be less costly and require fewer weak points where pieces can jam, crumble, fold or clog the manufacturing process while it is operating at a full rate of speed.

SUMMARY

A new type of system and method for moving cut pieces from a web printing press at high rates of speed through a process and to an accumulator stacker is provided which allows machinery to operate at or near maximum manufacturing rates. Embodiments of the invention include an under-shingling device which creates a stream of under-shingled cut pieces. Embodiments of the invention further may include a gap generation device for establishing a gap in the stream of under-shingled pieces at predetermined intervals.

In one embodiment, a method of processing cut pieces is provided. The method includes cutting a moving web of paper into a plurality of pieces such that each piece has a same predetermined size or length. The web of paper is moving at a first speed. The method further includes grabbing each cut piece and accelerating each cut piece to a second predetermined speed. The second predetermined speed if faster than the first predetermined speed. The accelerating of each piece establishes a first gap between each one of the plurality of pieces that were cut from the web. Each piece is then decelerated to a third speed while the tail end of each piece is lifted to allow the next piece to slide underneath and establish an under-shingled stream of pieces.

Embodiments may further include accelerating a portion of the under-shingled stream of pieces in order to generate a gap therein. The accelerating taking place at intervals such that the gap is generated at predetermined intervals.

Additional embodiments may comprise a method of handling a flow of product pieces that includes under-shingling each product piece under each previous product piece to create a flow of under-shingled product pieces. The embodiment may further comprise generating a spacing gap at predetermined intervals of the flow of under-shingled product pieces such that a predetermined number of pieces are between each spacing gap.

Another embodiment provides a device for processing flat articles. The device includes an under-shingling device. The under-shingling device includes an accelerator section that accelerates each piece in a stream of pieces to a first speed, a decelerator decelerates each piece in succession and a tail lifter that is underneath the stream of pieces and contacts a tail portion of each article as it passes such that each succeeding articles' leading edge slides under the tail portion of the preceding article. The tail lifter contacts each flat article as the decelerator is decelerating the same article all the while the succeeding piece is sliding thereunder.

A gap generation device may be provided downstream from the under-shingling device. The gap generation machine has a first set of pinch belts for moving a first portion of the under-shingled stream of flat articles at a first speed and a second set of pinch belts for moving a second portion of the under-shingled stream of flat articles at a second speed. The second speed being greater than the first speed such that the second set of pinch belts when operating during a predetermined interval create a gap in the stream of under-shingled flat articles.

BRIEF DESCRIPTION OF THE DRAWINGS

For a more complete understanding, reference is now made to the following description taken in conjunction with the accompanying Drawings in which.

DETAILED DESCRIPTION

Figure 1:
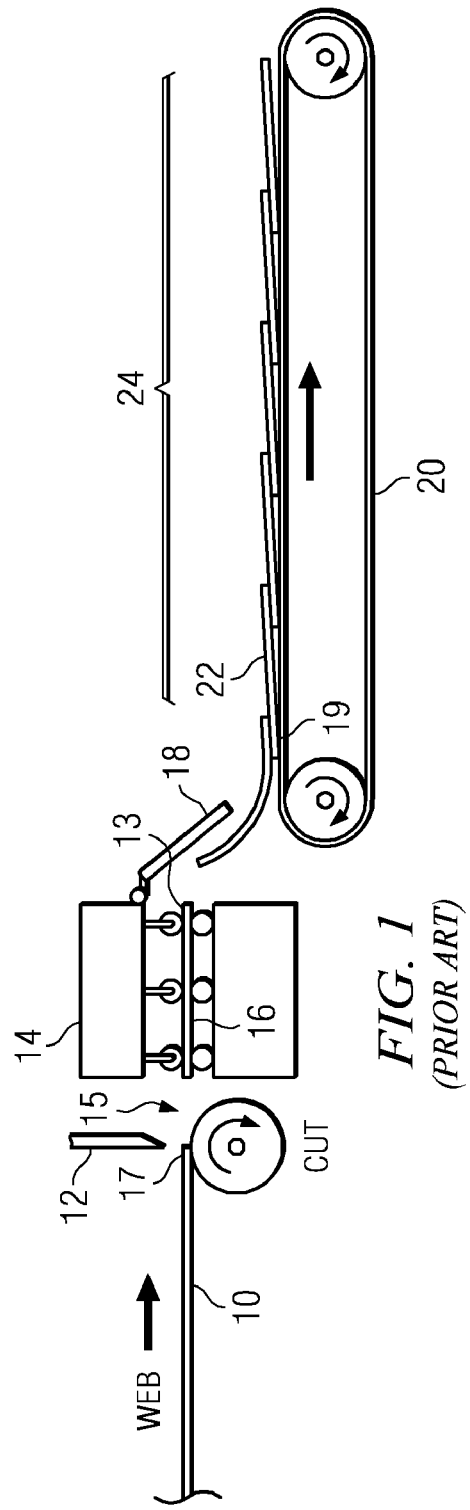
FIG. 1 illustrates a prior art side elevation of a cutter and over-shingling apparatus.

Referring now to the drawings, wherein like reference numbers are used herein to designate like elements throughout, the various views and embodiments of an under-shingled article handling and stacking system and method are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1, it is shown that a web 10 is cut by a cutter or rotary cutting machine 12 at predetermined lengths. It is important to understand that the leading edge 17 of the piece being cut must be grabbed by the gain or accelerator device 14 prior to the cut or else the cut piece will fall to the ground and not be transferred through the system. The about to be cut piece of paper's leading edge 17 is grabbed by the accelerator 14 so that it can be placed on a predetermined path through the processes. The grabbing device or accelerator 14 pulls the just cut piece away from the cutter such that a small space 15 is established between each of the consecutive pieces as they are cut and then accelerated by the gain accelerator 14. In all known current designs this acceleration and resulting over-shingled stream is performed at a fixed speed. In other words, the manufacturer decides that the accelerator should accelerate each piece to a fixed speed that is a certain percentage greater than the speed of the web 10. This percentage is called the gain of the accelerator 14. Thus, the cut piece 16 is removed from the web 10 at a faster rate of speed than the web speed wherein the percent increase of the speed is referred to as the gain. The change in speed creates a small distance or space or gap 15 between each consecutive piece as they are cut. The space or gap established by the accelerator 14 between each consecutive piece 16 must be large enough to be sufficient for under-shingling wherein the paper is allowed to free fall via a diverter such that there is enough time for the next piece to overlap the tail of the previously cut piece on a slower conveyor 20. The slower conveyor may be moving at a rate that is slower than the speed of the web 10.

In an embodiment of the invention, an accelerator and under-shingler is provided that has an adjustable speed or gain such that the cut piece is not necessarily moved at a constant speed during the acceleration and under-shingling process. An embodiment is adjustable in such a way that the space between the consecutive pieces is sufficient for under-shingling interpretation (the mechanical aspect of the new under-shingling concept) and/or the tail grabbing operation of the exemplary embodiments which will be discussed below.

Figure 4:
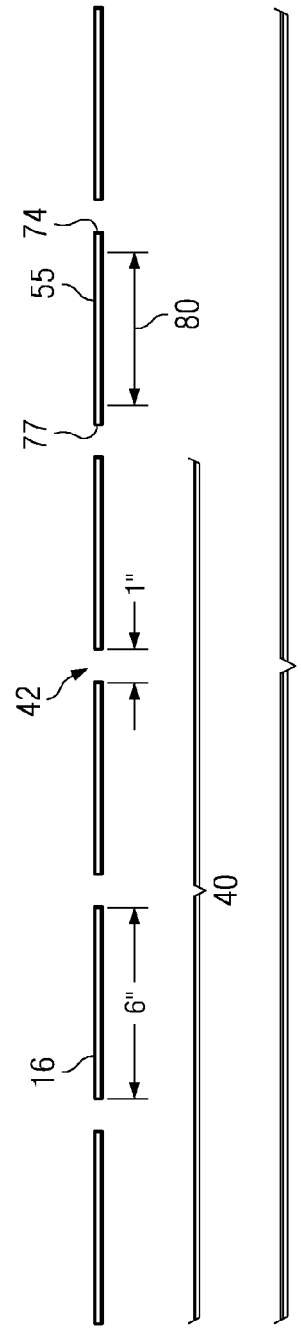
FIG. 4 illustrates a side view of spaced, cut pieces.

Referring now to FIG. 4, an example is provided to aid the reader in understanding some concepts associated with embodiments of the invention. Assume a web is running at 1,200 feet/minute, which in this example is equal to 35,000 impressions/hour (IPH). The 35,000 impressions/hour is indicative of how many times the printing cylinder rotates in order to produce identical impressions on the web as the web moves. Each time the image is printed by the press' print cylinder on the web it is called a single impression. A single impression may include, for example, four copies of a same printed material. In an exemplary example, assume that the impression is twenty-four inches long and has four copies therein. The impression is cut by the rotary cutter 12 into four six inch pieces such that each piece or product 16 is one quarter of one impression 40. If the accelerator 14 accelerates each piece so that a one inch space is created in between each consecutive piece, then the accelerator must operate at a gain of about 0.166%. This means that the accelerator must accelerate each piece such that it is traveling about 0.166% faster than the surface speed of the web 10 prior to the cutter 12. The one inch space 42 generated by the accelerator 14, in this example, provides enough space for the over-shingling of a prior art device. FIG. 4 depicts an example spacing of cut pieces as they exit a prior art accelerator and over-shingling device operating at a fixed speed.

Figure 5:
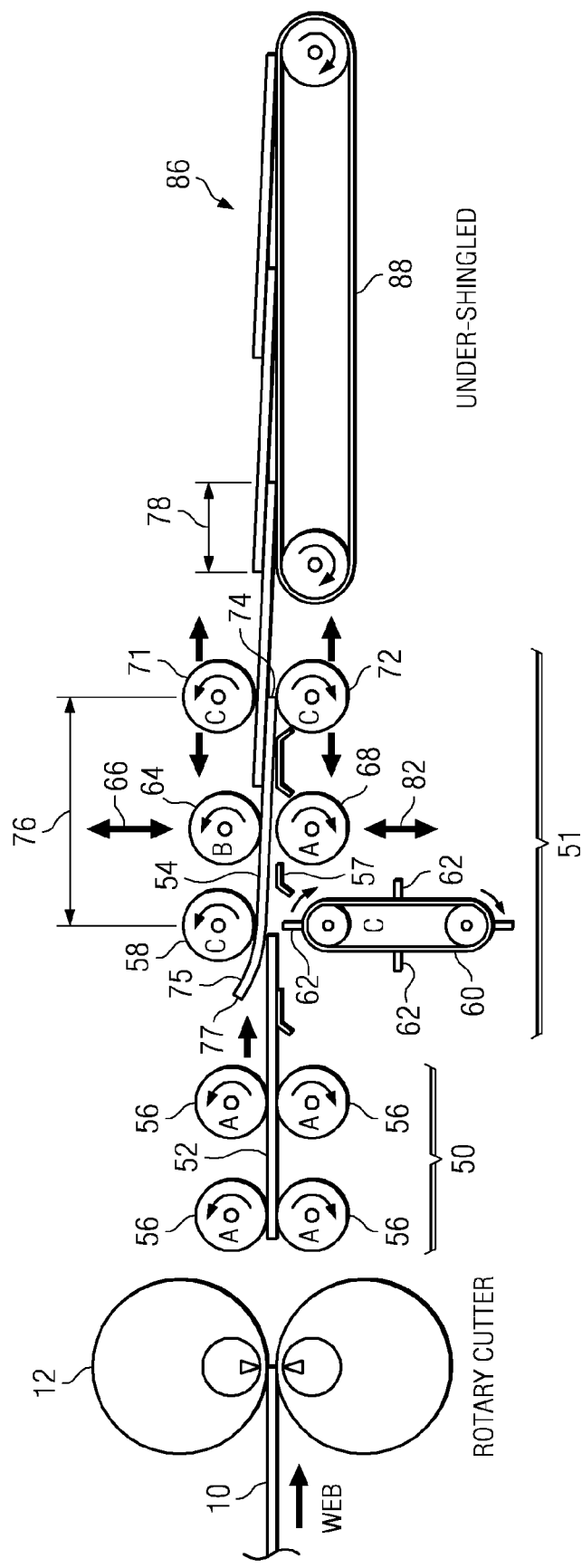
FIG. 5 illustrates a side elevation of an exemplary cutter and under-shingling apparatus with a tail grabber.

Referring now to FIG. 5, the importance of the example in FIG. 4 is provided because the accelerator section 50 of an exemplary embodiment is now being used in conjunction with the under-shingling device 51 to create a slow down in the progression of cut pieces such that a newly cut piece 52 slides under the tail end of the just previously cut piece 54. This under-lapping or under-shingling is performed without allowing any pieces to freely move or free float in the air as is used and required in prior art devices in the diverter section 18 of a prior art over-shingling device. Furthermore, embodiments of the invention do not allow the product to fly in or through air creating an uncertainty in the overall performance of the device. Embodiments of the present invention fully control each sheet or cut piece as it is cut, accelerated, under-shingled and decelerated through embodiments of the new novel under-shingling process. When a prior art diverter 18 (from FIG. 1) has a jam in it due to an inaccurate cut or crease, crinkle or otherwise, the entire machine comes to a screeching halt due to free flying product sheets through the diverter being a weak point in the prior art manufacturing process. Hundreds of thousands of pages may be cut and destroyed in a prior art over-shingling process before the line is shut down.

Embodiments of the present invention avoid this weakness or flaw in the prior art over-shingling process by establishing a more controlled under-shingling process, method and device that can operate at higher speeds with more accurate over or under-shingling for substantially any size piece in different printing runs.

In embodiments of the present invention, the acceleration or take away speed of the accelerator 50 is managed and controlled with an adjustable gain to increase product velocity depending on the product length and the speed of the web. By adjusting the gain of the exemplary accelerator the space or gap created between each piece can be controlled to be the same size regardless of the size of the cut piece. Using the example of FIG. 4, regardless of the size of the piece 16 (i.e., 5", 6", 8", 24") the gap size 42 can be kept constant at, for example one inch. It is understood that the gap size can be adjusted to be any size that the manufacturer requires. The point here is that the gap size can be controlled to be consistently the same size regardless of the cut piece size and regardless of how fast the surface speed of the web is running. The overall goal is to create a constant distance relationship between each product regardless of the length of the product or the speed at which the product is being printed and cut from the web printing device. It is important to understand that exemplary embodiments may have a space 42 between each product of substantially any workable distance, but the space can be controlled to be the same distance regardless of the speed of the web or the product length. It should further be understood that the gap size 42 can be selected to accommodate down stream devices. That gap size is elected to establish a fixed under-shingling distance, so that every piece regardless of length or speed of the overall stream of piece movement is under-lapped by the same distance or amount.

Still referring to FIG. 5, we see a web 10 approaching a rotary cutter 12. Again it is understood that there are varying types of rotary cutters in the industry and that embodiments of the invention are not limited to a rotary cutter, but could use substantially any type of appropriate cutter. The web 10 is grabbed by the adjustable accelerator 50 and sliced to its predetermined length. The newly cut piece 52 is accelerated forward by the adjustable accelerator 50 via the driven rollers 56. Each of the driven rollers 56 are driven at the same speed thereby accelerating the cut piece 52 forward. The next portion of an embodiment, sometimes referred to as a tail grabber, lifts the tail 77 of the previously cut piece 54 up via a vacuum roller 58 whose lowest outer circumferential surface is positioned from about 1 mm to 2 cm higher than the upper surface of the newly cut piece 52 or above the guide surface 57 below the stream of newly cut pieces. The vacuum roller 58 lifts or holds the tail portion 75 of the previously cut piece 54 (grabs the tail end) such that the newly cut piece 52 is accelerated by the accelerator 50 and the associated drive rollers 56 to slide underneath the tail portion of the previous cut piece 54. A positioner or end lifter 60, which has a surface speed that is substantially similar to the surface speed of the vacuum roller 58 has spaced flaps, rods or bumps extending outward thereon (enforcers 62) that slow and help position the newly under-shingled piece 52 as it slides underneath the previously cut piece 54. The circumferential surface speed of the vacuum roller 58 and the positioner with the enforcers 62 thereon are substantially similar. Furthermore, the circumferential speed of rollers 56 in the adjustable accelerator is 20%-50% faster than the circumferential speed of the vacuum roller and the enforcers 62. Roller 64 may be an idler roller, which may be spring loaded to float up and down above each piece in the direction of the arrows 66. Drive roller 68 may operate at substantially the same speed as drive rollers 56, but it may be necessary that drive roller 68 operate at a speed such that its circumferential surface is moving at a speed that is between being less than or equal to the speed of drive rollers 56 and greater than or equal to the speed of the circumferential speed of vacuum roller 58. It is understood that during startup, idler roller B may have to be accelerated to at least a predetermined speed that is substantially similar to the speed of roller 68 so that product flow through the exemplary tail grabber and under-shingling device does not jam, crinkle or rip pieces as they flow therethrough. Pinch rollers 71 and 72 are rotating with a circumferential speed that is substantially the same and substantially as the circumferential speed of vacuum roller 58 and the enforcers 62. As such, each piece is accelerated and decelerated in a controlled manner through the accelerator 50 and under-shingling 51 devices.

In some embodiments of the invention, the distance 76 between the pinch roller 71 and the vacuum roller 58 is equal to the length of a piece (54, or 52) minus the under-lap distance 78. The under-lap distance being the distance that the leading edge 74 of a just cut piece 52 under-laps the tail end 75 of a previously cut piece 54. The under-lap distance can range from about one quarter of an inch to more than half the length of a piece 52. The length of the piece 52 is equal to the distance from the leading edge of the piece 74 to the trailing edge or tail 75 of the piece.

In another embodiment of the invention, roller 64 and roller 68 are both idle rollers that may speed up and slow down with the speed of the piece or product moving therebetween. In yet another embodiment, the same two rollers 64 and 68 may be pinch rollers that spin at substantially the same speed as each other, but may vary with the idle or with the speed of the product or piece 54 moving therebetween as well. Furthermore, both rollers 64 and 68 may move up and down in a substantially vertical direction to aid the lifting or holding of the tail end of the previously cut piece 54 by the vacuum roller 58. The up and down movement of pinch rollers 64 and 68 may be described as an up and down oscillation having a frequency equal to the piece frequency moving therebetween. The oscillation may have an upper peak position that occurs sometime during the middle 80% of the length of a piece 54. A middle 80% length of a piece is shown in FIG. 4 as the central area 80 of a piece 55 that is between the leading edge 74 and the trailing edge 77 of a piece 55. The possible oscillation of roller 68 is shown with the dotted arrow 82 in FIG. 5.

Figure 2:
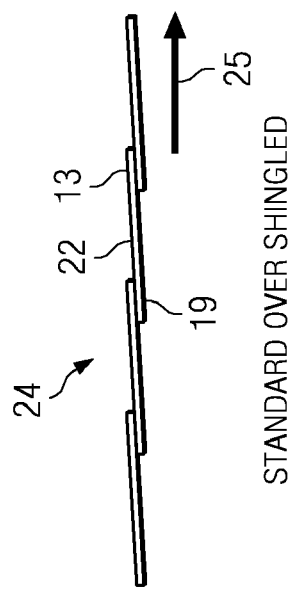
FIG. 2 illustrates a side elevation of an over-shingled stream of pieces.

As can be seen, an exemplary embodiment receives newly cut pieces 52 from a web 10 and rotary cutter 12 and proceeds to tail grab a previously cut piece 54 by various means and hold the trailing portion or tail 75 of a previous cut piece in an uplifted or at an elevated level such that a newly cut piece 52 can be inserted, at least partially, thereunder resulting in the continuous production of an under-shingled stream of pieces 86. The under-shingled stream of pieces has the advantage of being able to be created and to move at a rapid rate along a production line and conveyors 88 without being lifted or blown by air or being caught under a leading edge of the piece as discussed above with respect to over-shingled streams of product 24 in FIG. 2. Furthermore, embodiments of the invention provide a tail grabbing, tail holding or tail lifting means that is not limited in speed or movement by a free falling portion of a cut piece as discussed above with respect to the diverter sections of an over-shingling device. This advantage allows an under-shingling device in accordance with the various embodiments to operate at higher web speeds and higher production speeds thereby increasing production of finished product in less time than previous devices.

In other embodiments of the invention, the end lifter 60 may rotate such that the enforcers 62 are used to slow down the accelerated and now decelerating newly cut piece 52 as it slips underneath the tail portion 75 of the previously cut piece 54. The enforcers 62 may also, as they move, lift the tail portion 75 or a portion proximate to the tail end 77 of the previously cut piece 54 from one sixteenth of an inch to about a half an inch to aid in the piece's continued contact with or hold of the vacuum roller 58.

In yet another embodiment of the invention, the roller 68 may not be a roller at all, but instead, be a smooth element that is substantially arced such that its upper surface is adjacent to the bottom of the previously cut piece 54. As the previously cut piece 54 slides over the arced smooth surface 68, the piece 54 is nudged upward. Furthermore, the smooth surface of the arc 68 may oscillate up and down to guide the piece there above it slightly upwards and aid with the under-lapping process. In yet another embodiment of the invention, the combination of pinch rollers 64 and 68 may be a guide that moves up and down thereby aiding with lifting the previously cut piece 54 to maintain the trailing portion of the previously cut piece in contact with the vacuum roller 58 while the next piece slides thereunder.

Figure 6:
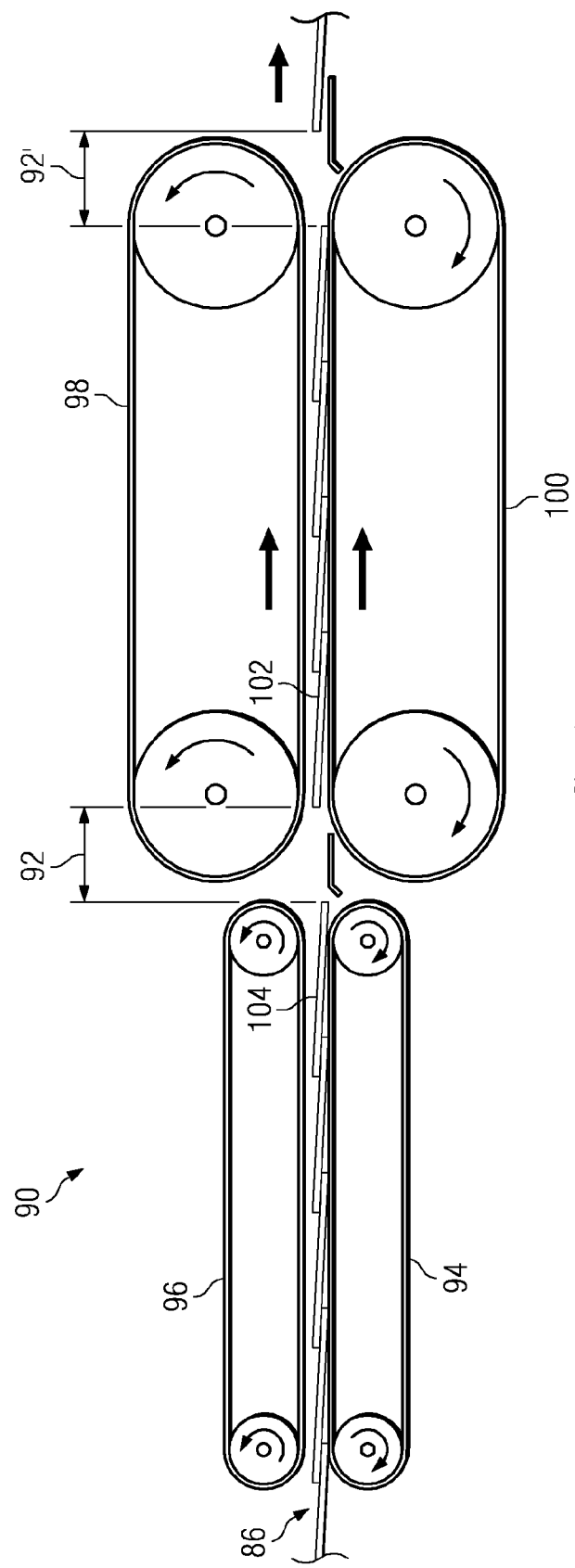
FIG. 6 illustrates an exemplary side elevation of a gap generating device and method.

Referring now to FIG. 6, a gap generator associated with the stream of under-shingled pieces or product is described. This gap generator 90 creates a gap in the now formed under-shingled stream of product 86 as it moves along the conveyor system (not specifically shown). An exemplary gap generator is used to create a gap in the stream of under-shingled pieces every predetermined number of under-shingled pieces. That is, a gap is created in the stream 84, for example, every twenty pieces. FIG. 6, for simplicity shows a gap generator that creates a gap in the moving stream of product 86 every four under-shingled pieces. The gap 92 is shown as it is being created and after it is being created 92 and 92'.

A first set of pinch belts 94 and 96 pinch the stream of under-shingled product 86 such that each individual product or piece is held in place relative to the other individual products or pieces as they moves as a stream between the pinch belts 94 and 96. The under-shingled product is transferred from the first set of pinch belts 94, 96 to a second set of pinch belts 98 and 100, which for a predetermined amount of time operate such that the belts 98, 100 move at substantially the same speed as the belts 94 and 96. In this example, four pieces of product are held between pinch belts 98 and 100, the speed of the pinch belts 98 and 100 simultaneously increase or accelerate to a faster speed thereby creating a gap between the last piece 102 in the pinch roller combination 98, 100 and the leading piece 104 in the pinch roller combination 94, 96. By accelerating the product in the second set of pinch belts 98, 100 a gap 92 is established. The second set of pinch belts 98, 100 are then decelerated back to the same speed as the first set of pinch belts 94, 96 and the process repeats every predetermined number of pieces. In some embodiments, the first and second sets of pinch belts are interspersed between each other such that while the first set of pinch belts is pinching the stream section and moving the stream at a first speed, the second set of pinch belts is not adjusting the speed of the stream section. Conversely, while the second set of pinch belts are pinching the stream section and moving the stream at a second speed, the first set of pinch belts is not adjusting the speed of the stream section. Other techniques for establishing a gap in a moving stream of over-shingled pieces have been established and are known in the art, for example, U.S. Pat. No. 4,161,092 to Buday et al. at column 12 beginning at line 58 through column 14, line 19, teaches another technique of providing a gap and is hereby incorporated by reference. Thus, various means for gap creation are known in the art of over-shingling product streams. Such processes may also be used in under-shingled streams.

Figure 7:
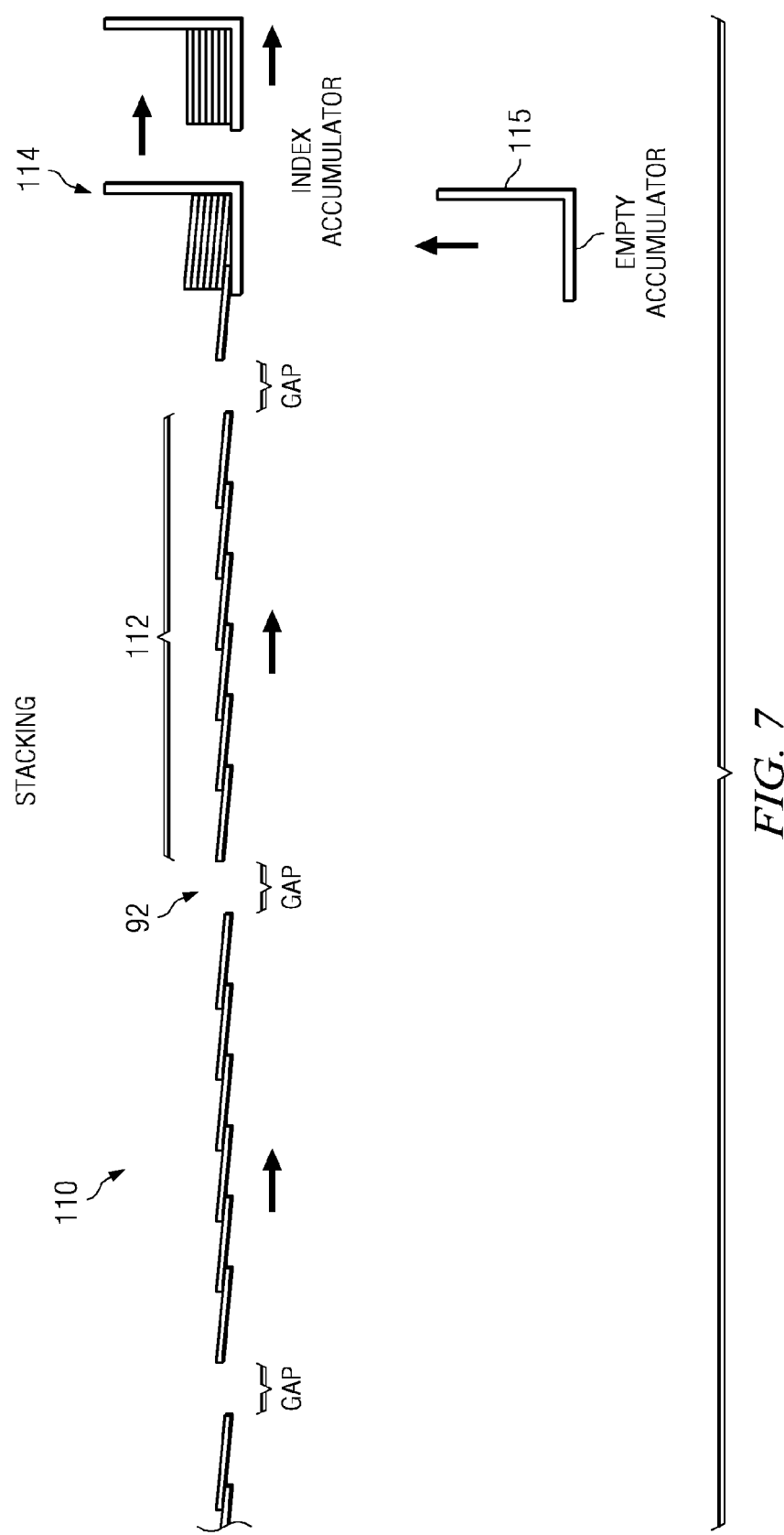
FIG. 7 illustrates an exemplary side elevation depicting an exemplary stream of under-shingled pieces having a gap every predetermined number of under-shingled pieces and an associated stacker-accumulator mechanism.

Referring now to FIG. 7, a stream of under-shingled pieces is shown having a gap 92 created by a gap generation device or means every predetermined number of pieces. The predetermined number of pieces between each gap 92 may be a few pieces to hundreds of pieces. The number of pieces in between the gap represents a number of pieces that the manufacturer would like in a stack of pieces. The predetermined number of pieces 112 can be provided to a stacking device merely by placing an obstruction or vertical stacker 114 in the way of the moving predetermined number of pieces between a gap. The pieces will stack automatically as each piece in the over-shingled stream slides underneath the piece in front of it thereby creating a stack of pieces equal to the number of predetermined pieces between each gap.

Figure 3:
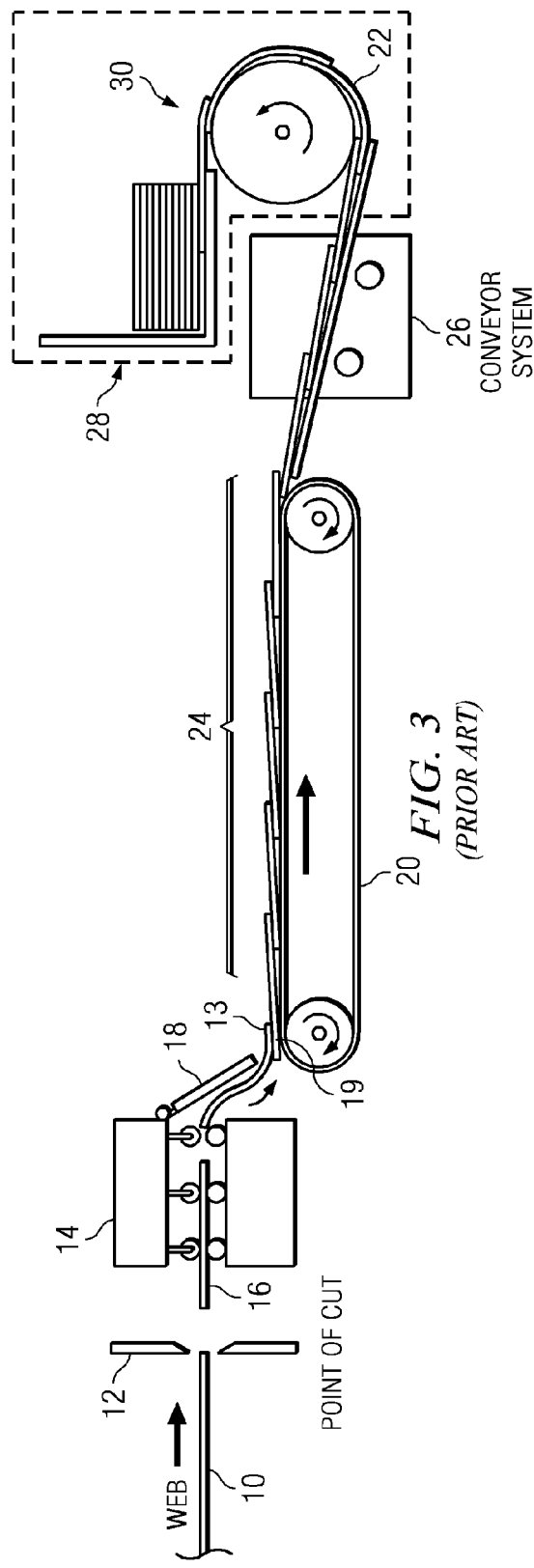
FIG. 3 illustrates a prior art side elevation of a cutter, over-shingling device, conveyor system and drum stacker system.

During the gap period 92 a full stacker 114 may be moved out of the path of the stream of over-shingled pieces while another stacking device 115 or obstacle is placed in front of the stream of over-shingled pieces to accumulate the next predetermined number of pieces up until the next gap 92. The result is a plurality of stacks comprising a predetermined number of pieces as predetermined by the manufacturers' spacing and gap creation in the over-shingled product stream. This method of accumulating or stacking pieces eliminates the need for turning an over-shingled stream of product (i.e., from the prior art) upside down, as shown in FIG. 3, via a drum or other means so that the accumulator will function such that stacking proceeds with each piece being slid underneath the preceding piece in the accumulator. The combination of the gap and the accumulators eliminates the need for having additional personnel continuously having to watch the end of the line at the accumulation section and remove stacks of product from the accumulator prior to it overfilling or overflowing. In an exemplary embodiment each accumulator 114 is stacked with a pre-counted or predetermined number of product pieces from the under-shingled stream. The gap 92 provides time for a first accumulator 114, after being filled with a first predetermined number of pieces, to be moved out of the way or indexed such that a second accumulator 115 can be put into position to accumulate the next predetermined number of product or pieces 112. When the next gap arrives at the accumulator, the accumulator 115 is moved out of the way and a new accumulator is then placed in front of the stream of under-shingled pieces and the next predetermined number of pieces are accumulated in the accumulator. In some embodiments, the gap is needed for providing a space or short time period for an obstacle to be placed in the stream such that a means for producing an accumulated stack of product can be created and then pushed as a stack out of the stream flow. The resulting accumulated stack will have a predetermined count equal to the number of pieces between the gaps of predetermined number of pieces and may provide a means for simplifying boxing, wrapping, banding or finalizing the finished stack of pieces for complete production and delivery.

As is probably noticed by one reading this document, an advantage of under-shingling is that an under-shingled stream allows one to put their hand or an object in front of a leading edge of the under-shingled stream and as a result, one will find that each subsequent piece will slide underneath the piece in front of it and a stack will be accumulated right into the person's hand or in front of the obstacle placed in front of the stream of under-shingled pieces. Thus, the addition of another machine, for example, a prior art style stacker, which requires that the over-shingled stream be turned upside down prior to being stacked can be eliminated. Thus, embodiments of the present invention remove some complexity of prior art stacking devices that incorporate, for example, a drum or other means for turning the over-shingled stream of pieces upside down prior to being stacked.

Referring back to the gap generator, the gap generator of an exemplary embodiment or method grabs a predetermined number of under-shingled pieces, for example one-hundred, and accelerates them slightly faster than the continuous stream of under-shingled pieces, but the relative position of each piece in the accelerated predetermined number of pieces remains constant with respect to each other piece therein. Thus, the amount of under-shingling or overlap between each piece remains constant even though a gap is being created in the continuous stream of under-shingled product.

Advantages of embodiments of the present invention and method provide a means for increasing the speed of processing of pieces in a printing system whereby the pieces can be moved as a continuous stream of under-shingled pieces at a higher rate of speed than previously possible in over-shingled techniques. Additionally, by establishing a gap at predetermined places in the under-shingled stream of pieces, a predetermined count of pieces can be accumulated and indexed at or near the end of the stream in a manner such that the human or worker is not required to be present the entire time. Furthermore, predetermined stacks of pieces are generated in a manner such that each stack can have a specific count for boxing, wrapping or placing in a finished product container. Finally, embodiments of the present invention remove additional conveyor equipment that was previously required between a rotary cutter and a stacking mechanism wherein many adjustments were required when runs of pieces having different sizes were initiated. In other words, the downtime, or setup time for different runs of different sized products or pieces is greatly shortened because the number of mechanical adjustments and tuning in embodiments incorporating the present invention are minimized when compared to previous devices used in similar areas of a printing, cutting and accumulating process.

It will be appreciated by those skilled in the art having the benefit of this disclosure that this under-shingled article handling and stacking system and method provides a improved technique for handling flat articles such as paper at increased rates of speed while taking up less factory space. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of processing paper comprising:
cutting a moving web of paper into a plurality of pieces, each piece having a same predetermined length, the web of paper moving at a first speed;
grabbing and accelerating each piece to a second predetermined speed, the second predetermined speed being faster than the first predetermined speed, the accelerating establishing a first gap between each piece;
decelerating each piece to a third predetermined speed while lifting a tail end of each piece using a vacuum roller to allow a next piece to slide there under to create an under-shingled stream of pieces, the next piece being the piece immediately following each piece, each next piece under-shingling each piece by a predetermined amount.

2. The method of claim 1, wherein said cutter is a rotary cutter.

3. The method of claim 1, wherein the grabbing and accelerating each piece is performed by upper and lower pinch belts.

4. The method of claim 1, wherein the lifting of the tail end of each piece is further performed by at least one of a flap, a rod, and a bump.

5. The method of claim 1, further comprising:
accelerating a portion of the under-shingled stream of pieces and creating a stream gap between a first portion and a second portion of the stream of under-shingled pieces.

6. The method of claim 5, further comprising;
stacking the first portion; and
moving the stacked first portion out of a flow of the stream of under-shingled pieces during the stream gap.

7. A device for processing flat articles, the device comprising:
an under-shingling device, the under shingling device comprising:
an accelerator section for accelerating a stream of flat articles to a first speed;
a decelerator section for decelerating each flat article in succession;
a tail lifter underneath the stream of flat articles that contacts a tail portion of each flat article passing such that each succeeding flat article's leading edge slides under the tail portion each tail portion of each flat article creating an under-shingled stream of flat articles, the tail lifter contacting each flat article as the decelerator section is completing the deceleration of each flat article and,
a gap generation device for generating a gap at intervals of the under-shingled steam of flat articles, the gap generation device comprising:
a first set of pinch belts for moving the a first portion of the under-shingled stream of flat articles at a first speed; and
a second set of pinch belts for moving a second portion of the under-shingled stream of flat articles at a second speed during predetermined intervals, the second speed being greater than the first speed.

8. The device of claim 7, wherein the gap generation device further comprises means for gap generation in the under-shingled stream of flat articles.

9. The device of claim 7, wherein when the first portion and the second portion are a same portion of the under-shingled stream of flat articles, and wherein when the first set of pinch belts are moving the same portion, the second set of pinch belts are not moving the same portion, and wherein when the second set of pinch belts are moving the same portion, the first set of pinch belts are not moving the same portion.

* * * * *